US010120148B2

(12) United States Patent
Mathai et al.

(10) Patent No.: US 10,120,148 B2
(45) Date of Patent: Nov. 6, 2018

(54) DEVICES WITH OPTICAL PORTS IN FAN-OUT CONFIGURATIONS

(71) Applicant: HEWLETT PACKARD ENTERPRISE DEVELOPMENT LP, Houston, TX (US)

(72) Inventors: Sagi Mathai, Sunnyvale, CA (US); Michael Renne Ty Tan, Menlo Park, CA (US); Paul Kessler Rosenberg, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/340,968

(22) Filed: Nov. 1, 2016

(65) Prior Publication Data

US 2018/0120524 A1     May 3, 2018

(51) Int. Cl.
*G02B 6/12*     (2006.01)
*G02B 6/42*     (2006.01)
*G02B 6/34*     (2006.01)

(52) U.S. Cl.
CPC ....... *G02B 6/4249* (2013.01); *G02B 6/12004* (2013.01); *G02B 6/34* (2013.01); *G02B 6/428* (2013.01); *G02B 6/4269* (2013.01); *G02B 6/4284* (2013.01); *G02B 2006/12147* (2013.01)

(58) Field of Classification Search
CPC ..................................................... G02B 6/428
See application file for complete search history.

(56) References Cited

U.S. PATENT DOCUMENTS

| | | | | |
|---|---|---|---|---|
| 3,777,154 | A * | 12/1973 | Lindsey | G02B 6/43 250/227.11 |
| 5,818,984 | A * | 10/1998 | Ahmad | G02B 6/43 385/14 |
| 6,233,376 | B1 * | 5/2001 | Updegrove | G02B 6/43 385/135 |
| 6,410,941 | B1 | 6/2002 | Taylor | |
| 7,058,245 | B2 * | 6/2006 | Farahi | G02B 6/12002 372/39 |
| 7,729,581 | B2 | 6/2010 | Roston | |
| 9,109,948 | B2 | 8/2015 | Pinguet | |

(Continued)

OTHER PUBLICATIONS

Dirk Taillaert, "Grating Couplers for Coupling Between Optical Fibers and Nanophotonic Waveguides," Aug. 4, 2006, 7 pp, http://pcphotonics.intec.ugent.be/download/pub_2000.pdf.

*Primary Examiner* — Omar R Rojas
(74) *Attorney, Agent, or Firm* — Hewlett Packard Enterprise Patent Department

(57) ABSTRACT

Examples herein relate to devices with optical ports in fan-out configurations. An electrical device may have a substrate with an electrical port on a first face of the substrate and a plurality of optical ports on a second face of the substrate. The plurality of optical ports may be positioned in a fan-out configuration on the second face of the substrate. The electrical device may also have an integrated circuit with an electrical connection and a plurality of optical connections. A first face of the integrated circuit may be coupled to the substrate. The electrical connection of the integrated circuit may be communicatively coupled to the electrical port of the substrate, and the plurality of optical connections may be communicated coupled to the plurality of optical ports of the substrate.

17 Claims, 4 Drawing Sheets

(56) References Cited

U.S. PATENT DOCUMENTS

| | | |
|---|---|---|
| 9,379,816 B2 | 6/2016 | Yang |
| 2010/0006784 A1 | 1/2010 | Mack |
| 2010/0059822 A1 | 3/2010 | Pinguet |
| 2012/0155806 A1 | 6/2012 | Doerr |
| 2014/0044389 A1* | 2/2014 | Uemura .................. G02B 6/12 385/14 |
| 2015/0037044 A1 | 2/2015 | Peterson |
| 2015/0241631 A1 | 8/2015 | Fish |
| 2016/0116688 A1 | 4/2016 | Hochberg |

* cited by examiner

DEVICES WITH OPTICAL PORTS IN FAN-OUT CONFIGURATIONS

BACKGROUND

Optical communication is becoming more prevalent in computer systems and network communications. Optical signals can propagate in a variety of different media, such as optical waveguides, between different computer systems and network devices. Modern Integrated Circuits (ICs) designed to facilitate optical devices have a profound impact on computing, electronics, and photonics.

BRIEF DESCRIPTION OF THE DRAWINGS

The following detailed description references the drawings, wherein.

DETAILED DESCRIPTION

The amount of data that is generated stored, calculated, and transmitted through computers and computing networks have explosively grown with the rapid expansion in the use of computers to host business applications, websites, cloud, etc. As more data is communicated, optical communication is becoming more prevalent in computer systems and network communications. Optical signals can propagate in a variety of different media, such as optical waveguides, between different computer systems and network devices. Modern Integrated Circuits (ICs) designed to facilitate optical devices have a profound impact on computing, electronics, and photonics.

As the sizes of electronic dies have shrunk, some electrical and optical integrated circuits have become monolithically integrated on silicon substrates in advanced CMOS nodes. Due to the higher cost of these nodes, it may be effective to minimize the size of dies. This may present challenges for electrically and optically interfacing integrated circuits while providing practical thermal management. Examples disclosed herein address these technical challenges by providing for wafer scale packaging approaches that simultaneously solves the electrical, optical, and thermal interfacing challenges. For example, an electrical device may have a substrate with an electrical port on a first face of the substrate and a plurality of optical ports on a second face of the substrate. The plurality of optical ports may be positioned in a fan-out configuration on the second face of the substrate. The electrical device may also have an integrated circuit with an electrical connection and a plurality of optical connections. A first face of the integrated circuit may be coupled to the substrate. The electrical connection of the integrated circuit may be communicatively coupled to the electrical port of the substrate, and the plurality of optical connections may be communicatively coupled to the plurality of optical ports of the substrate. In this manner, the fan-out positioning of the optical ports allows separation of high density optical input-output on an integrated circuit to a larger pitch on a substrate that may match the pitch of optical fibers and optical fiber connectors. Thus, examples herein may enable off-chip optical and electrical communication of electrical-optical integrated circuits.

Figure 1:
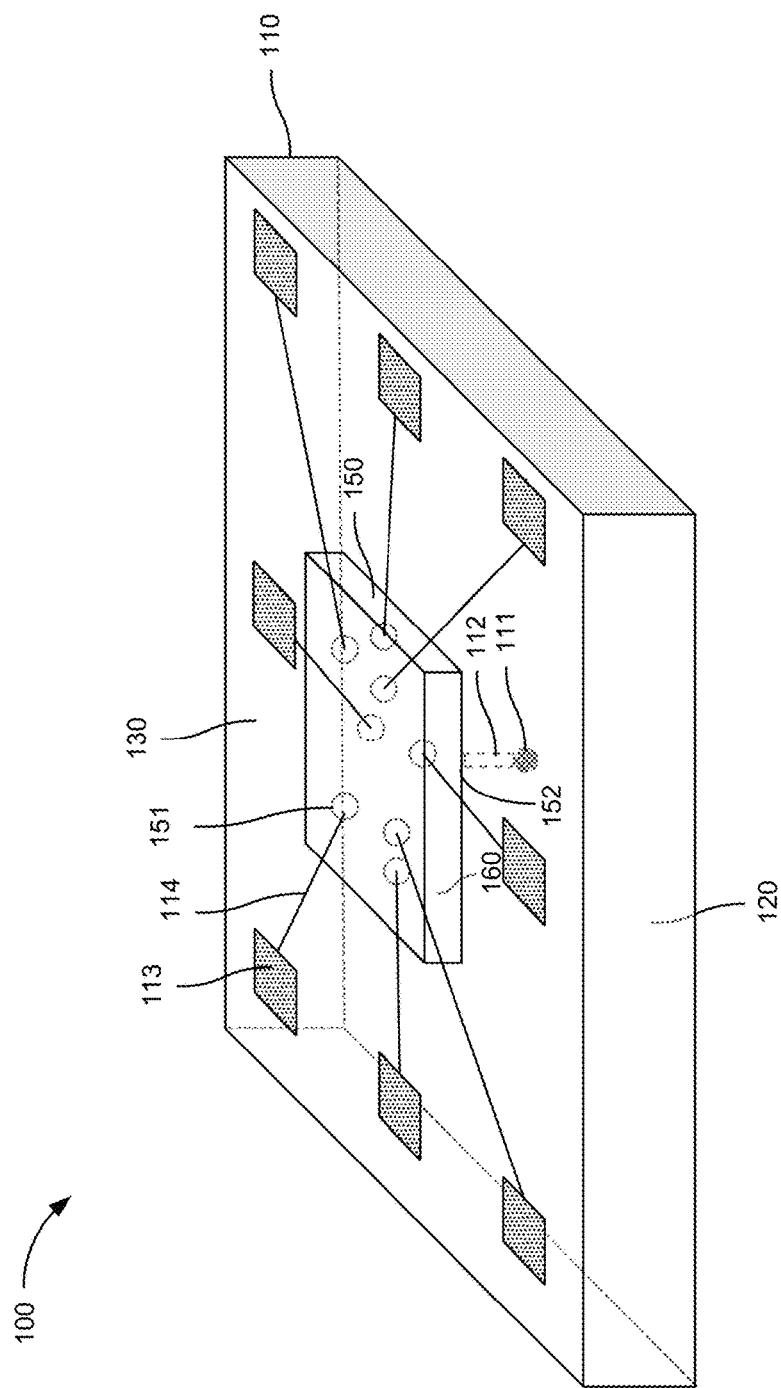
FIG. 1 is a diagram of an example device with optical ports in a fan-out configuration.

Referring now to the drawings, FIG. 1 illustrates an example electrical device 100 having a substrate 110 with optical ports 113 positioned in a fan-out configuration. Electrical device 100 may include substrate 110 and an integrated circuit 150 coupled to the substrate 110. Electrical device 100 may be a device or system that can be implemented in a variety of compute or network systems, including those involving, but not limited to, communications, electrical computing and communications, or both.

Substrate 110 may be a wafer, panel or solid substance onto which other components are adhered. The substrate 110 may serve as a foundation for microelectronic and photonic devices, and may be the base that electronic and photonic devices are deposited. The substrate may, in some examples, be a thin slice of material, which may include semiconductors such as silicon and germanium, compound semiconductors such as gallium arsenide (GaAs) and indium phosphide (InP), or dielectric insulators such as glass, silicon oxide and aluminum oxide. In some examples, the substrate may include multiple materials, including but not limited to the examples listed above. For example, substrate 110 may include a semiconductor layer and a dielectric layer, such as in a silicon-on-insulator (SOI) structure or a silicon-on-glass structure.

Substrate 110 may have an electrical port 111 on a first face 120 of the substrate 110. First face 120 may be a surface of the substrate 110, and may, in some examples, be a face with a dielectric layer of an SOI or silicon-on-glass substrate 110. As explained later, the first face 120 of the substrate is opposite a second face 130 which may be the face onto which an integrated circuit 150 may be coupled. Electrical port 111 may be a terminal for connecting an electrical network or circuit to an electrical circuit associated with electrical device 100, and may be a port of entry or exit for electrical energy, such as electrical power, low speed (<1 Gbps) and high speed data (>1 Gbps). For example, electrical port 111 may include a solder bump and/or a solder pad.

Substrate 110 may also include a plurality of optical ports 113 on a second face 130 of the substrate. Second face 130 may be a second flat surface of the substrate 110, and may, in some examples, be a face of a semiconductor layer of substrate 110, such as the silicon layer of an SOI or silicon-on-glass substrate. It should be understood that the second surface may be patterned with other materials such as but not limited to silicon dioxide, poly-silicon, polymers and metals. Optical ports 113 may be a terminal for connecting an optical signal delivery mechanism, such as optical fiber, with electrical device 100. For example, optical ports 113 may include optical couplers for connecting an optical communications fiber cable to waveguides in the substrate 110 which may deliver optical signals to processing components of electrical device 100. Details of such is described in further detail below.

In some examples, the optical ports 113 may be positioned on the substrate 110 in a fan-out configuration. A fan-out configuration may position the optical ports 113 in a manner so that the optical ports 113 are distributed on the second face 130 of substrate 110. In some examples, the fan-out configuration may cause the optical ports 113 to be positioned near the edges of the second face 130, such as the example illustrated in FIG. 1. As described in further detail herein, the optical ports 113 may be positioned in such a configuration so that a pitch between two optical ports may match a pitch of two optical fibers that may be coupled to the two optical ports.

Continuing to refer to FIG. 1, electrical device 100 may also include an integrated circuit 150 having an electrical connection 152 and a plurality of optical connections 151. Integrated circuit 150 may be a set of electronic circuits formed on a semiconducting material, such as silicon, performing functions akin to larger circuits made from discrete components. Integrated circuit 150 may have any combination of electrical inputs and outputs and optical inputs and outputs. In some examples, a first face of the integrated circuit 150 may be coupled to the substrate 110. For example, the first face of the integrated circuit 150 may be coupled to the second face 130 of the substrate 110. As a specific example, the integrated circuit 150 may be coupled by flip chip solder reflow onto the substrate 110. Furthermore, in some examples, the substrate 110 may have a coefficient of thermal expansion (CTE) that is compatible with the CTE of the integrated circuit 150 so that thermal strain between the two components may be minimized, particularly as the electrical device 100 is heated during operations.

The electrical connection 152 and the plurality of optical connections 151 may, in some examples, be located on the first face of the integrated circuit 150. Similar to electrical port 111 of the substrate 110, the electrical connection 152 may be a terminal for connecting the integrated circuit 150 to an electrical network or circuit. In some examples, the electrical connection 152 may include a solder bump, copper pillar, and/or a solder pad. In some examples, the integrated circuit 150 may have multiple electrical connections 152. Similarly, the plurality of optical connections 151 may be terminals for connecting an optical signal delivery mechanism with the integrated circuit 150. Optical connections 151 and/or optical ports 113 may include optical couplers such as, but not limited to, grating couplers, turning mirror couplers, edge couplers, lens couplers, total internal reflection couplers, and/or expanded beam optical couplers.

As described in further detail below, optical connections 151 may also include photodetectors to convert optical signals to electrical signals for consumption by the integrated circuit 150. In some examples, the photodetectors may be found on the integrated circuit 150, in which case the photodetectors convert the optical signals received through optical connections 151 to electrical signals for the integrated circuit. Alternatively, the photodetectors may be found on the substrate 110. In such cases, the photodetectors may intercept the optical signals traveling in the waveguides 114, convert the optical signals to electrical signals, and send the electrical signals to the integrated circuit 150 via optical connections 151, which in these examples may be electrical connections for receiving electrical signals converted from the original optical signals received at optical ports 113.

Electrical connection 152 may be communicatively coupled to the electrical port 111 of the substrate 110. Communicatively coupled may mean that the electrical connection 152 and electrical port 111 are electrically connected so that an electric signal may be passed between the two. For example, a conducting wire may connect the electrical connection 152 and the electrical port 111. Specifically, a conducting via 112 may couple the electrical connection 152 on the first face of the integrated circuit 150 with the electrical port 111 on the second face 120 of the substrate 110, where the conducting via 112 traverses the entire thickness of the substrate.

The plurality of optical connections 151 of the integrated circuit 150 may be communicatively coupled to the plurality of optical ports 113 of the substrate 110. The optical connections 151 and the optical ports 113 may be coupled by the creation of an optical path so that an optical signal may be passed between the two. From example, a waveguide or other form of optical channel may connect the optical connections 151 and the optical ports 113.

As a specific example, each of the plurality of optical connections 151 may be communicatively coupled to one of the plurality of optical ports 113 by a waveguide 114 of the substrate 110. The waveguides 114 may be monolithically integrated with the substrate 110. For example, for cases where substrate 110 may be a SOI or silicon-on-glass substrate, the monolithically integrated optical waveguides 114 may be defined on a thin layer of silicon of the substrate 110. Thus, the silicon layer of a SOI or silicon-on-glass substrate provides the medium for which the optical waveguides are fabricated. Such monolithically integrated waveguides 114 may, for example, be formed by etching the thin layer of silicon material.

By coupling the plurality of optical connectors 151 of the integrated circuit 150 with the plurality of optical ports 113 of the substrate 110, which are positioned in a fan-out configuration on the second face 130 of the substrate 110, electrical device 100 is capable of providing a high density of optical input/output fibers with a small integrated circuit. Otherwise, the relatively large size of the optical fibers may interfere with an integrated circuit's ability to be coupled with a high density of optical ports. A fan-out configuration of optical ports 113, which are each communicatively coupled with optical connections 151 of the integrated circuit 150, allow for the optical ports 113 to match a pitch of optical fibers to which the ports are to be connected.

Additionally, by placing the electrical port 111 of the substrate 110 on the first face 120, additional efficiency may be accomplished. For example, a plurality of electrical ports 111 may be found on the first face 120 coupled with a plurality of electrical connections 152 of the integrated circuit 150 by multiple conducting vias 112. Similar to the optical ports 113 on the second face 130, a plurality of electrical ports 111 may be positioned in a fan-out configuration. A fan-out configuration may position the electrical ports 111 in a manner so that the electrical ports 111 are distributed on the first face 120 of substrate 110. For example, the electrical ports 111 may be positioned in such a configuration so that the electrical device 100 may be easily coupled with another device or component (e.g., a printed circuit board) via the first face 120 of the substrate 100. In such cases, the electrical ports 111 may be connected to the electrical connections 152 by a combination of conducting vias through the substrate 110 and conducting metal traces on the first face of the substrate. In this manner, the electrical ports 111 and optical ports 113 are on separate faces of the substrate, thus allowing for increased use of the available substrate real estate.

In some examples, electrical ports 111 may be positioned in a fan-out configuration by implementing redistribution layers on the first face 120 or second face 130 of the substrate 150. For example, a redistribution layer may be used on the second face 130 of the substrate 150 to fan-out electrical traces that connect electrical connections 152 to electrical vias 112, which then transfer signals to the electrical ports 111 on the first face 120 of the substrate.

In yet another alternative example, a plurality of electrical ports 111 of the substrate 110 may be positioned on the second face 130 of the substrate in a second fan-out configuration. In these instances, the electrical ports 111 share the face of the substrate with the optical ports 113.

Figure 2:
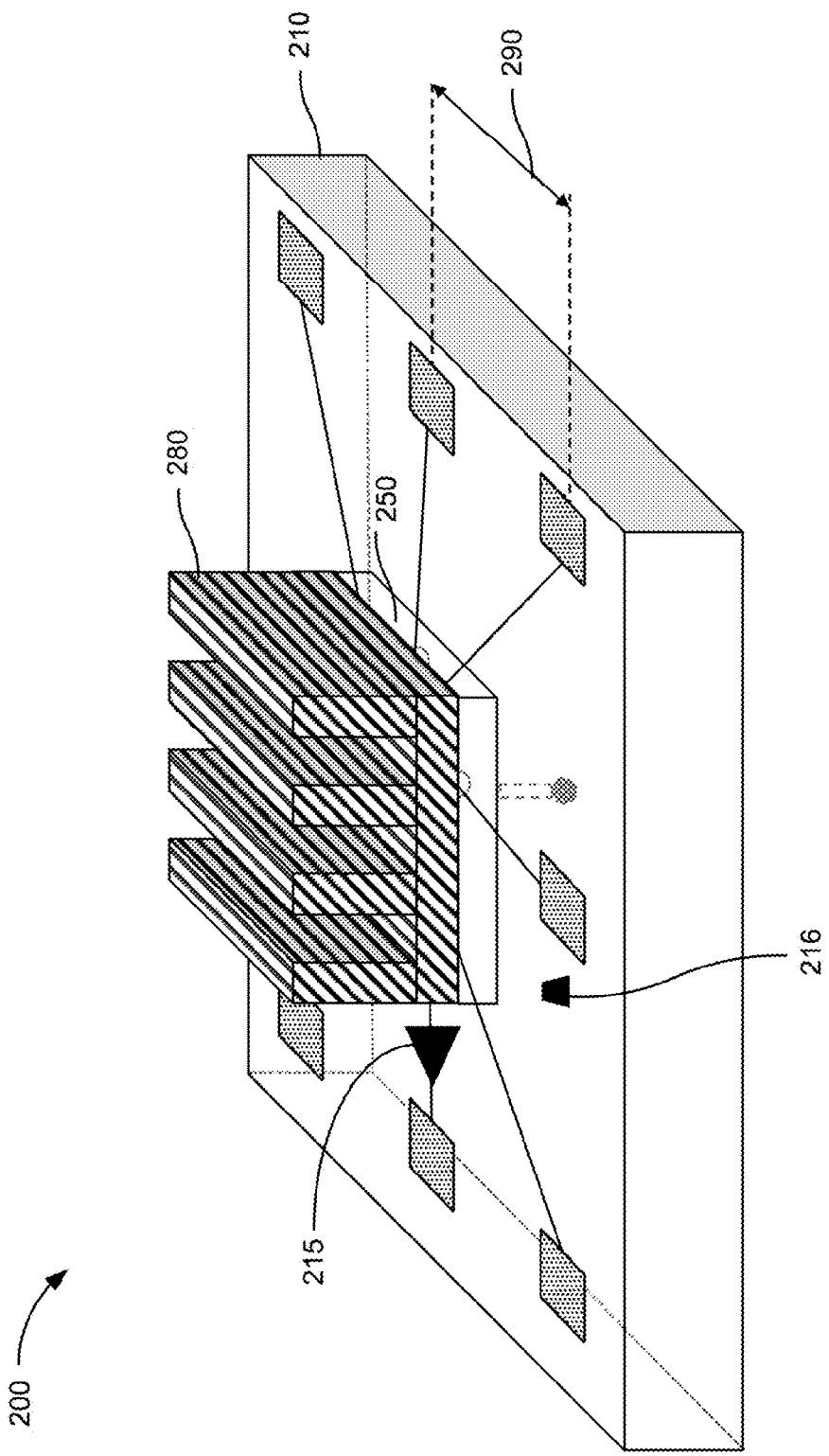
FIG. 2 is a diagram of a second example device with optical ports in a fan-out configuration.

FIG. 2 illustrates a second electrical device 200 with optical ports in a fan-out configuration. Similarly to device 100 of FIG. 1, electrical device 200 may include substrate 210 and an integrated circuit 250 coupled to the substrate 210. Electrical device 210 may be a device or system that can be implemented in a variety of compute or network systems, including those involving computing and communications.

As previously explained, substrate 210 may include one or more electrical ports on a first face of the substrate and a plurality of optical ports on a second face of the substrate. The plurality of optical ports may be positioned on the second face of the substrate in a fan-out configuration. Integrated circuit 250 may be coupled to the substrate 210 by a first face of the integrated circuit 250 and the second face of the substrate 210. The electrical ports of the substrate 210 may be communicatively coupled to electrical connections of the integrated circuit 250 by conducting vias and traces. The optical ports of the substrate 210 may be communicatively coupled to optical connections of the integrated circuit 250 by waveguides, which may, in some examples, be monolithically integrated in the second face of the substrate 210.

In some examples, the substrate 210 may further include a plurality of optical amplifiers 215 coupled to the plurality of monolithically integrated optical waveguides of the substrate 210. In some instances, each optical waveguide may have an optical amplifier 215 coupled to it. The optical amplifier may be a device or component that may amplify or boost optical signals traversing the optical waveguides. For example, an optical signal that may travel from an external optical fiber to an optical port of the substrate 210 through a waveguide and to an optical connection of the integrated circuit 250 (or vice versa) may suffer signal loss at various points in the path. Thus, an optical amplifier may amplify the optical communication signals through the waveguide.

Furthermore, in some examples, the substrate 210 may have a light source coupled to each of the plurality of monolithically integrated optical waveguides. A light source may be a laser or other form of optical signal generating device. In some examples, the light source may include semiconductor materials such as III-V semiconductor materials. In some examples, a light source may replace an optical amplifier 215 or it may be coupled with an optical amplifier 215 and coupled together with the optical waveguide.

As mentioned previously, in some examples, the substrate 210 may further include a photodetector that is coupled with the integrated circuit 250 that can convert optical signals to electrical signals. A photodetector may translate the optical signals received from the optical ports to electrical signals to be processed by the integrated circuit 250. Furthermore, electrical device 200 may include additional optical components, such as modulators, lasers, splitters, combiners, filters, wavelength division multiplexers and the like.

Each of the plurality of optical ports of the substrate 210 may be positioned on a second face of the substrate in a fan-out configuration. As described previously, a fan-out configuration may position the optical ports in a manner so that the optical ports are distributed on the second face of substrate 210. In the example illustrated by FIG. 2, the fan-out configuration may cause the optical ports to be positioned near the edges of the second face of the substrate 210.

The optical ports may be positioned in such a configuration so that a pitch 290 between two optical ports may match a pitch of two optical fibers that may be coupled to the two optical ports. As an example, each optical port of the substrate 210 may be coupled to an external optical fiber. The optical fibers may be connected to the optical ports by an optical connector, which may house one or more optical fibers. For example, an optical connector may include a bundle of multiple optical fibers, each fiber connecting to one optical port. The fan-out configuration of the optical ports may have pitch 290 which accounts for the sizes and pitches of the optical fibers.

Additionally, substrate 210 may house one or more alignment features 216. Alignment feature 216 may be a mechanical (pillar, groove, sphere attached within a hole, etc), visual (for example, metal pattern), or other mechanism for facilitating alignment of optical fiber connectors which are to be coupled to the plurality of optical ports of the substrate 210. In some examples, each of the optical ports of the substrate may be positioned near an alignment feature to assist the connection of optical fibers, connectors, or sockets to the port. For example, each port may connect directly with optical fibers or optical connectors of optical fibers. Alternatively, each port may connect directly with a socket, which allows simple connect and disconnect of optical fibers or connectors. In this case the socket is aligned to the alignment features 216. Alignment features 216 may, for example, be defined on the second face of the substrate 210 by processes such as, but not limited to, photolithography, etching, imprinting, molding and electroplating.

Electrical device 200 may further include a heat sink 280 coupled to a second face of the integrated circuit 250. Because the electrical connections and optical connections of the integrated circuit 250 are located on the first face of the integrated circuit 250, the second face may be an available surface for mounting heat sink 280. In instances such as that illustrated in FIG. 2, the heat sink 280 may be same size as the integrated circuit 250 or, in some examples, the heat sink 280 may be larger than the integrated circuit 250. In some embodiments, the heatsink will also interface with other active optical devices, such as optical amplifier 215, implemented on substrate 210. In other embodiments, a separate heatsink may interface with the active optical devices, such as optical amplifier 215, implemented on the substrate 210.

Figure 3:
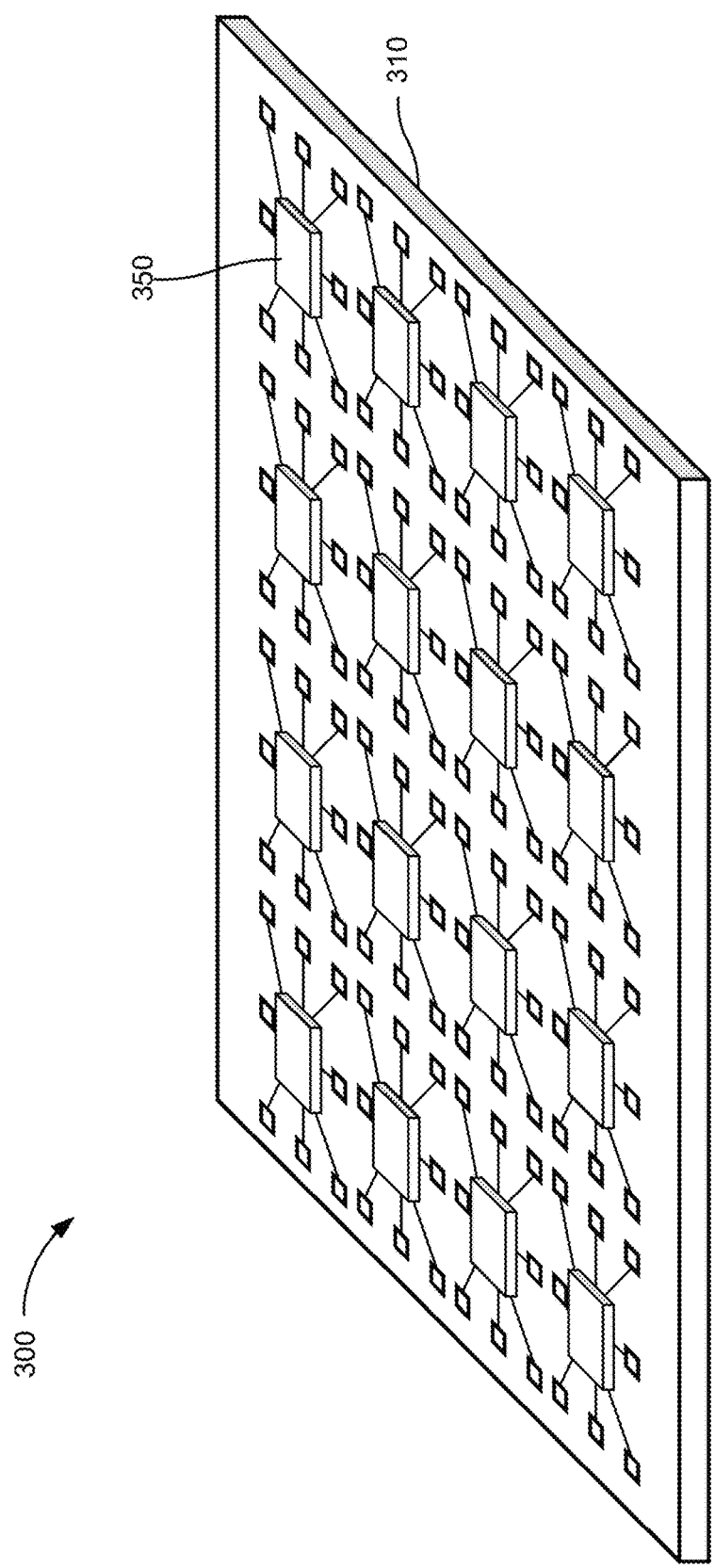
FIG. 3 diagram of an example substrate with a plurality of devices with optical ports in fan-out configurations.

FIG. 3 illustrates an example substrate 310 with a plurality of integrated circuits 350 with optical ports in fan-out configurations. Integrated circuits 350 and substrate 310 may be a part of a system 300 comprising multiple integrated circuits 350 with input/outputs manufactured on a simple substrate 310. In this manner, electrical devices, such as those described with relation to FIG. 1 and FIG. 2, may be effectively mass produced and tested.

As an example, a relatively large substrate 310, such as a SOI or silicon-on-glass wafer, may be provided with both electrical paths and optical waveguides integrated on the substrate 310. For example, conducting vias and traces may be created in the substrate to connect electrical ports on a first face of the substrate to the second face of the substrate. Monolithically integrated waveguides may be defined on the second face of the substrate, and optical ports may be created on at least one end of the waveguides. These features may be created to accommodate a plurality of integrated circuits 350, where each integrated circuit has a set of waveguides and optical ports, and electrical traces and electrical ports. The integrated circuits 350 may be mounted on the substrates by techniques such as flip chip solder reflow and underfill.

The substrate 310, which houses multiple integrated circuits and their electrical and optical I/O systems, may be tested en masse then be diced into individual electrical devices akin to the devices 100 and 200 illustrated in FIGS. 1 and 2, respectively. In other embodiments, the substrate 310 may be diced into large chips with multiple electrical devices.

Figure 4A:
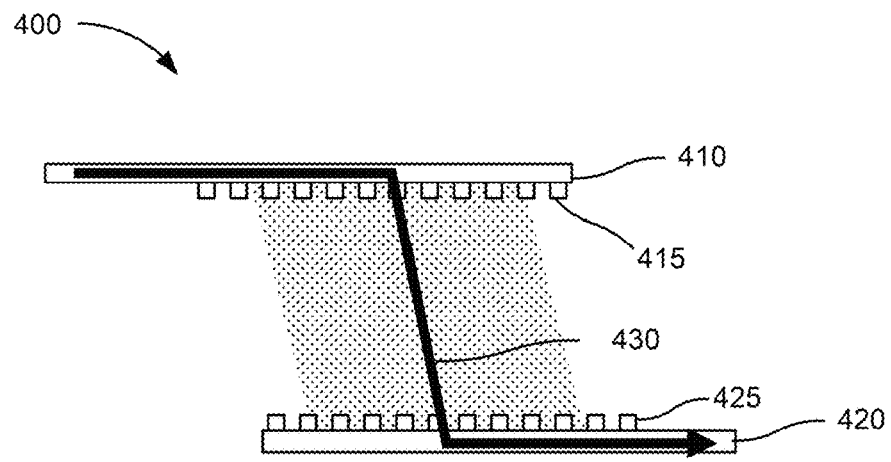
FIG. 4A is a diagram of an example optical coupler.

FIG. 4A illustrates an example optical coupler 400. Optical coupler 400 may have a first optical waveguide 410 with a first grating 415 and a second optical waveguide 420 with a second grating 425. An optical signal 430 may travel through the first waveguide 410, to an optical port, for example. The first grating 415 may allow light signals to exit the first optical waveguide 410, through a medium, such as air or other relatively transparent material (such as an optical underfill), and into the second optical waveguide 420 through its second grating 425. The optical coupler 400 may be designed to enable larger light beams (i.e., >10 microns) to couple between the substrate and integrated circuit. Large light beams may be more tolerant to misalignment in the plane of the substrate or integrated circuit. Their large Rayleigh range may enable higher tolerance to the gap between substrate and integrated circuit. Large light beams may have less tolerance for the angle between the substrate and integrated circuit, but the angle can be controlled by flip chip solder reflow, for example.

Figure 4B:
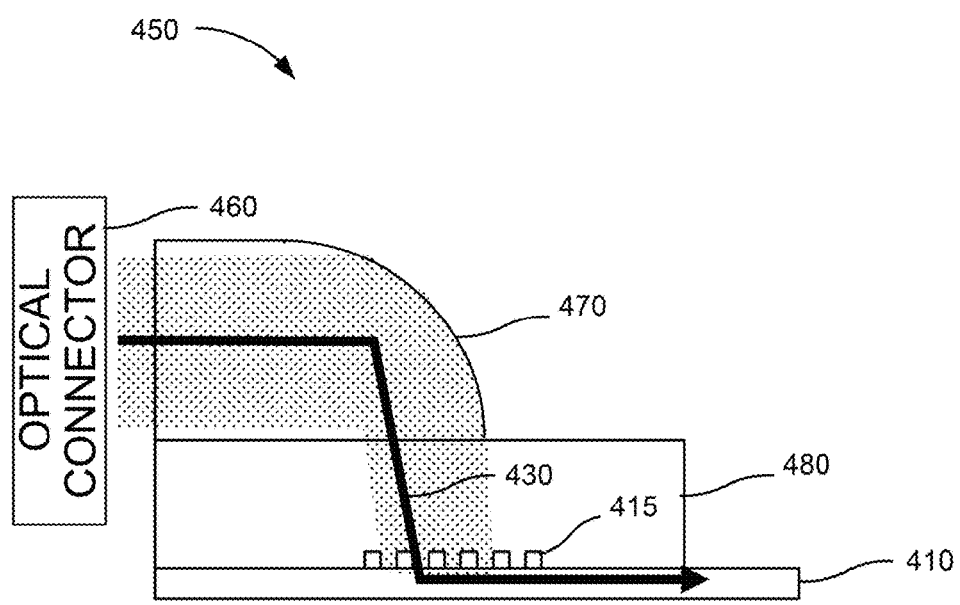
FIG. 4B is a diagram of a second example optical coupler.

FIG. 4B illustrates a second example optical coupler 450. Second optical coupler 450 may have an optical connector 460, which may be a device that connects with a waveguide such as an optical fiber, and a total internal reflection (TIR) mirror 470. An optical signal 430 traveling from the optical connector 460 into TIR mirror 470 may be internally reflected inside the TIR mirror 470. The TIR mirror may be flat to simply turn the light or it may be shaped to image the light efficiently between the optical connector and 460 and grating 415. The optical signal 430 may then traverse a second medium 480, which may be air or other relatively transparent material, such as silicon dioxide or plastic. The optical signal 430 may enter a waveguide 410 through a grating 415.

It should be noted that optical coupler 400 and optical coupler 450 are but two examples of optical coupling technology. Any optical coupler may be employed in the systems and devices described herein, and includes, but is not limited to grating couplers, turning mirror couplers, edge couplers, lens couples, and/or total internal reflection couplers. These optical couplers may be used, for example, to connect an optical fiber to an optical port 113 of the substrate 110 of electrical device 100 or to connect a monolithically integrated waveguide 114 with an optical connection 151 of the integrated circuit 150 of electrical device 100.

The foregoing describes a number of examples for electrical devices with optical and/or electrical ports in a fan-out configuration and their applications. It should be understood that the examples described herein may include additional components and that some of the components described herein may be removed or modified without departing from the scope of the examples or their applications. It should also be understood that the components depicted in the figures are not drawn to scale, and thus, the components may have different relative sizes with respect to each other than as shown in the figures.

Further, the sequence of operations described in connection with FIGS. 1-4B are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

It should further be noted that, as used in this application and the appended claims, the singular forms "a," "an," and "the" include plural elements unless the context clearly dictates otherwise.

What is claimed is:

1. An electrical device, comprising:
   a substrate comprising an electrical port on a first face of the substrate and a plurality of optical ports on a second face of the substrate, wherein the second face is opposite that of the first face; and
   an integrated circuit comprising an electrical connection and a plurality of optical connections, wherein a first face of the integrated circuit is coupled directly to the second face of the substrate, and wherein the electrical connection is communicatively coupled to the electrical port of the substrate and the plurality of optical connections are communicatively coupled to the plurality of optical ports of the substrate;
   wherein the plurality of optical ports are positioned in a fan-out configuration on the second face of the substrate such that the plurality of optical ports are positioned to surround the integrated circuit;
   the substrate further comprising:
      a conducting through substrate via communicatively coupling the electrical connection of the integrated circuit with the electrical port of the substrate, and
      a plurality of electrical ports positioned in a fan-out configuration on the first face of the substrate; and
   the integrated circuit further comprising:
      a plurality of electronic connections communicatively coupled to the plurality of electrical ports of the substrate by conducting traces and conducting vias.

2. The electrical device of claim 1, the substrate further comprising a plurality of monolithically integrated optical waveguides communicatively coupling the plurality of optical connections of the integrated circuit with the plurality of optical ports of the substrate.

3. The electrical device of claim 2, wherein the substrate is a silicon-on-insulator or silicon-on-glass substrate, and the plurality of monolithically integrated optical waveguides are defined on a thin layer of silicon of the substrate.

4. The electrical device of claim 2, the substrate further comprising an optical amplifier coupled to each of the plurality of monolithically integrated optical waveguides.

5. The electrical device of claim 2, the substrate comprising a light source coupled to each of the plurality of monolithically integrated optical waveguides and a photodetector coupled to the integrated circuit to convert optical signals to electrical signals.

6. The electrical device of claim 1, wherein a pitch between the plurality of optical ports on the second face of the substrate matches a pitch of optical fibers or connectors which are to be coupled to the plurality of optical ports.

7. The electrical device of claim 1, further comprising a heat sink coupled to a second face of the integrated circuit.

8. The electrical device of claim 1, the substrate further comprising an alignment feature to align optical fibers, connectors, or sockets relative to the plurality of optical ports.

9. The electrical device of claim 1, wherein each of the plurality of optical connections of the integrated circuit comprises an optical coupler, and each of the plurality of optical ports of the substrate comprises an optical coupler.

10. A system, comprising:
a substrate comprising a plurality of electrical ports on a first face of the substrate, a plurality of optical ports on a second face of the substrate, wherein the second face is opposite that of the first face, a plurality of through substrate conducting vias, and a plurality of monolithically integrated optical waveguides; and
an integrated circuit comprising a plurality of electrical connections and a plurality of optical connections, wherein a first face of the integrated circuit is coupled directly to the second face of the substrate, and wherein the plurality of electrical connections are communicatively coupled by the plurality of through substrate conducting vias to the plurality of electrical ports of the substrate and the plurality of optical connections are communicatively coupled by the plurality of monolithically integrated optical waveguides to the plurality of optical ports of the substrate;
wherein the plurality of optical ports are positioned in a fan-out configuration on the second face of the substrate such that the plurality of optical ports are positioned to surround the integrated circuit;
the substrate further comprising:
a conducting through substrate via communicatively coupling the electrical connections of the integrated circuit with the electrical ports of the substrate, and
a plurality of electrical ports positioned in a fan-out configuration on the first face of the substrate; and
the integrated circuit further comprising:
a plurality of electronic connections communicatively coupled to the plurality of electrical ports of the substrate by conducting traces and conducting vias.

11. The system of claim 10, the substrate further comprising at least one of an optical amplifier or a laser coupled to each of the plurality of monolithically integrated optical waveguides.

12. The system of claim 10, wherein a pitch between the plurality of optical ports on the second face of the substrate matches a pitch of optical fibers or connectors which are to be coupled to the plurality of optical ports.

13. The system of claim 10, wherein the substrate is a silicon-on-insulator or silicon-on-glass substrate, and the plurality of monolithically integrated optical waveguides are defined on a thin layer of silicon of the substrate.

14. The system of claim 10, the substrate further comprising an alignment feature to align optical fibers which are to be coupled to the plurality of optical ports.

15. An integrated circuit system, comprising:
a silicon-on-insulator substrate comprising a plurality of electrical ports on a first face of the substrate, a plurality of optical ports on a second face of the substrate, a plurality of electrical traces, and a plurality of monolithically integrated optical waveguides defined in a thin layer of silicon on the second face of the substrate; and
an integrated circuit comprising a plurality of electrical connections and a plurality of optical connections, wherein a first face of the integrated circuit is directly coupled to the second face of the substrate, and wherein the electrical connections are communicatively coupled by the plurality of electrical traces to the plurality of electrical ports of the substrate and the plurality of optical connections are communicatively coupled by the plurality of monolithically integrated optical waveguides to the plurality of optical ports of the substrate;
wherein the plurality of optical ports are positioned in a fan-out configuration on the second face of the substrate such that the plurality of optical ports are positioned to surround the integrated circuit, and wherein the plurality of electrical ports are positioned in a second fan-out configuration on the first face of the substrate,
the substrate further comprising:
a conducting through substrate via communicatively coupling the electrical connections of the integrated circuit with the electrical ports of the substrate, and
a plurality of electrical ports positioned in a fan-out configuration on the first face of the substrate; and
the integrated circuit further comprising:
a plurality of electronic connections communicatively coupled to the plurality of electrical ports of the substrate by conducting traces and conducting vias.

16. The integrated circuit system of claim 15, wherein a pitch between the plurality of optical ports on the second face of the substrate matches a pitch of optical fibers or connectors which are to be coupled to the plurality of optical ports.

17. The integrated circuit system of claim 16, the substrate further comprising an alignment feature to align optical fibers, connectors, or sockets relative to the plurality of optical ports.

* * * * *